W. T. WELLS.

Improvement in Hinges.

No. 122,088.  Patented Dec. 19, 1871.

WITNESSES:
Robert H. Sterrett
John W. Smith

INVENTOR,
WILLIAM T. WELLS,
per Chas. P. Housum
His Attorney

W. T. WELLS.
Improvement in Hinges.
No. 122,088. Patented Dec. 19, 1871.
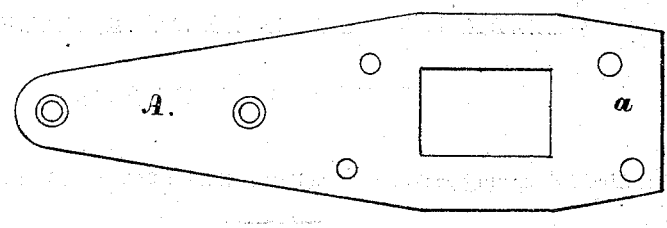
Fig. 4.
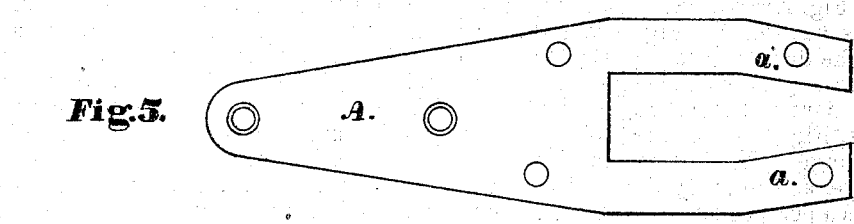
Fig. 6.
Fig. 5.
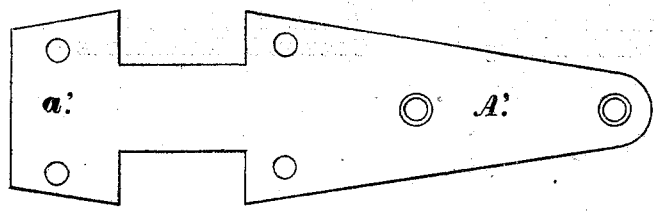
Fig. 7.
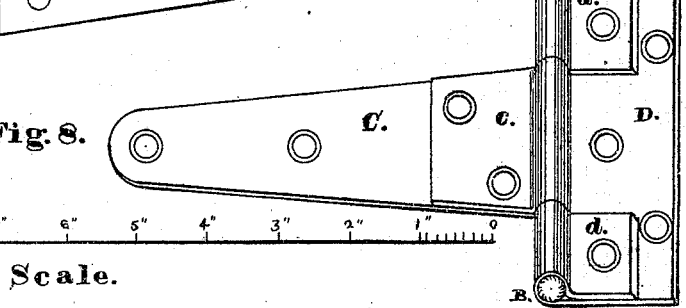
Fig. 8.
Scale.
WITNESSES:
Joseph Gates
Robert R. Montgomery
INVENTOR:
WILLIAM T. WELLS,
per Charles P. Housum
HIS ATTORNEY.

UNITED STATES PATENT OFFICE.

WILLIAM T. WELLS, OF DECATUR, ILLINOIS.

IMPROVEMENT IN HINGES.

Specification forming part of Letters Patent No. 122,088, dated December 19, 1871.

*To all whom it may concern:*

Be it known that I, WILLIAM T. WELLS, of Decatur, in the county of Macon and State of Illinois, have invented certain Improvements in "T" or Strap Hinges, of which the following is a specification:

My invention relates to an improvement in that class of sheet-metal hinges known as the T-hinge and as the strap-hinge; and consists of the extension of the straps or of the leaf of the hinge around and beyond the pintle, and secured with a rivet or by the screws, nails, or bolts with which the hinge is put on.

Figure 1:
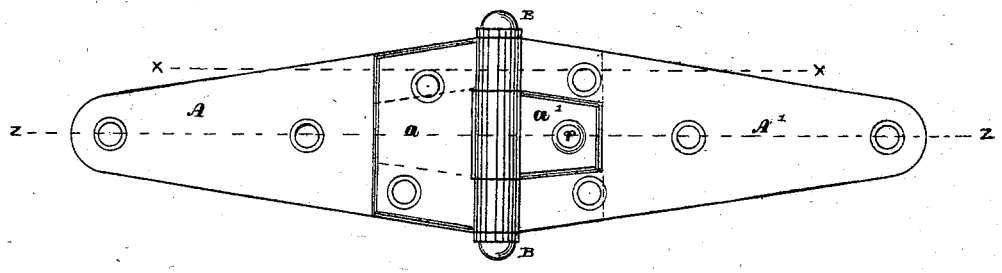
Figure 2:
Figure 3:

Figure 1 is a plan of a strap-hinge embodying my invention. Fig. 2 is a section taken through the dotted lines $z\,z$, Fig. 1. Fig. 3 is a section taken through the dotted lines $x\,x$, Fig. 1. Fig. 4 is a plan of the A part of the hinge. Fig. 5 is a plan of the A part of the hinge, as shown by the dotted lines, Fig. 1. Fig. 6 is a plan of the A' part of the hinge. Fig. 7 is a plan of the A' part of the hinge, as shown by the dotted lines, Fig. 1. Fig. 8 is a perspective view of a T-hinge embodying my invention.

A A' are the straps of the hinge; B, the pintle. The straps are cut in the forms shown in Figs. 4, 5, 6, and 7, the strap bent around and beyond the pintle, as shown at $a\,a'$, Fig. 1, and secured with a rivet, as shown at $r$, or, as is preferable, by the screws, nails, or bolts with which the hinge is put on. The straps, as shown in Figs. 4 and 6, may be used together, as shown in Fig. 1, or as shown in Figs. 4 and 7, or 5 and 6, or 5 and 7, as may be deemed preferable. Fig. 8 shows a T-hinge, the strap C doubled around and extended beyond the pintle, as shown at $c$, and the leaf D doubled around and extended beyond the pintle, as shown at $d\,d$, when the extensions of the strap and leaf can be secured, as is above stated. Either T or strap hinges, as commonly made, are cut off close to the pintle.

By my improvement the hinge is made double at its weakest point, viz., at the pintle and at the screw or nail holes nearest to the pintle, and across which the strap is generally broken.

I am aware that the sheet-metal hasp-hinges of trunks have the metal doubled over the pintle and extended beyond for strengthening, and this I do not claim of itself; nor do I claim the hinge of William I. Lewis, patented April 25, 1871; but What I do claim is—

A sheet-metal T or strap hinge with the ends of both the straps or strap and leaf extending around and beyond the pintle and secured by rivets or by the screws, nails, or bolts with which the hinge is put on, all as shown and described.

WM. T. WELLS.

Witnesses:
CHARLES P. HOUSUM,
GEORGE E. MOREHOUSE. (24)